US011393600B2

(12) United States Patent
Takeo et al.

(10) Patent No.: US 11,393,600 B2
(45) Date of Patent: Jul. 19, 2022

(54) CONTROL ROD MOTION MONITORING SYSTEM AND CONTROL ROD MOTION MONITORING METHOD

(71) Applicant: Hitachi-GE Nuclear Energy, Ltd., Hitachi (JP)

(72) Inventors: Satoshi Takeo, Hitachi (JP); Akira Konoma, Hitachi (JP); Akiyuki Tsuchiya, Hitachi (JP); Koji Matsumoto, Hitachi (JP); Takao Kondo, Hitachi (JP); Yuji Honma, Hitachi (JP)

(73) Assignee: HITACHI-GE NUCLEAR ENERGY, LTD., Hitachi (JP)

( * ) Notice: Subject to any disclaimer, the term of this patent is extended or adjusted under 35 U.S.C. 154(b) by 49 days.

(21) Appl. No.: 16/476,560

(22) PCT Filed: Jan. 12, 2017

(86) PCT No.: PCT/JP2017/000758
§ 371 (c)(1),
(2) Date: Jul. 9, 2019

(87) PCT Pub. No.: WO2018/131106
PCT Pub. Date: Jul. 19, 2018

(65) Prior Publication Data
US 2019/0355486 A1 Nov. 21, 2019

(51) Int. Cl.
*G21C 17/108* (2006.01)
(52) U.S. Cl.
CPC .................................. *G21C 17/108* (2013.01)
(58) Field of Classification Search
CPC ......... G21C 17/00; G21C 17/108; G21C 7/08
(Continued)

(56) References Cited

U.S. PATENT DOCUMENTS 4,333,797 A * 6/1982 Nishizawa ........... G21C 17/108
376/210
4,637,910 A * 1/1987 Impink, Jr. ............ G21C 17/00
376/216
(Continued)

FOREIGN PATENT DOCUMENTS

JP 62-228980 A 10/1987
JP 01-253695 A 10/1989
(Continued)

OTHER PUBLICATIONS

Extended European Search Report received in corresponding European Application No. 17891203.6 dated Jun. 9, 2020.
(Continued)

*Primary Examiner* — Jack W Keith
*Assistant Examiner* — Jinney Kil
(74) *Attorney, Agent, or Firm* — Mattingly & Malur, PC

(57) ABSTRACT

Provided is a control rod motion monitoring method and a control rod motion monitoring system, in which a control rod insertion in an entire core is monitored at all time during operation of a reactor and, when an abnormality occurs, a signal is issued to a countermeasure device that automatically starts operation and an alarm is issued to prompt operation of an operator. An LPRM detector in an LPRM assembly of the entire core is divided into four channels for each height; indicated values are averaged at all time; the average indicated value is compared with a set point; and a signal is issued to a countermeasure device when an abnormality occurs.

6 Claims, 2 Drawing Sheets

(58) Field of Classification Search
USPC .......................................................... 376/254
See application file for complete search history.

(56) References Cited

U.S. PATENT DOCUMENTS

| | | | | |
|---|---|---|---|---|
| 6,477,219 | B2 * | 11/2002 | Hirukawa | G21C 17/108 |
| | | | | 376/255 |
| 2002/0122522 | A1 * | 9/2002 | Goto | G21C 17/108 |
| | | | | 376/254 |
| 2003/0128793 | A1 * | 7/2003 | Karino | G21C 17/108 |
| | | | | 376/254 |
| 2013/0058447 | A1 * | 3/2013 | Takeuchi | G21C 17/00 |
| | | | | 376/241 |
| 2019/0214157 | A1 * | 7/2019 | Matsumoto | G21C 17/108 |

FOREIGN PATENT DOCUMENTS

| | | | |
|---|---|---|---|
| JP | 04-047291 | A | 2/1992 |
| JP | 05256978 | A * | 10/1993 |
| JP | 11-337678 | A | 12/1999 |
| JP | 11337678 | A * | 12/1999 |
| JP | 2004-245666 | A | 9/2004 |
| JP | 2005-061951 | A | 3/2005 |
| JP | 2012-163438 | A | 8/2012 |

OTHER PUBLICATIONS

International Search Report of PCT/JP2017/000758 dated Mar. 28, 2017.

* cited by examiner

[FIG. 1]
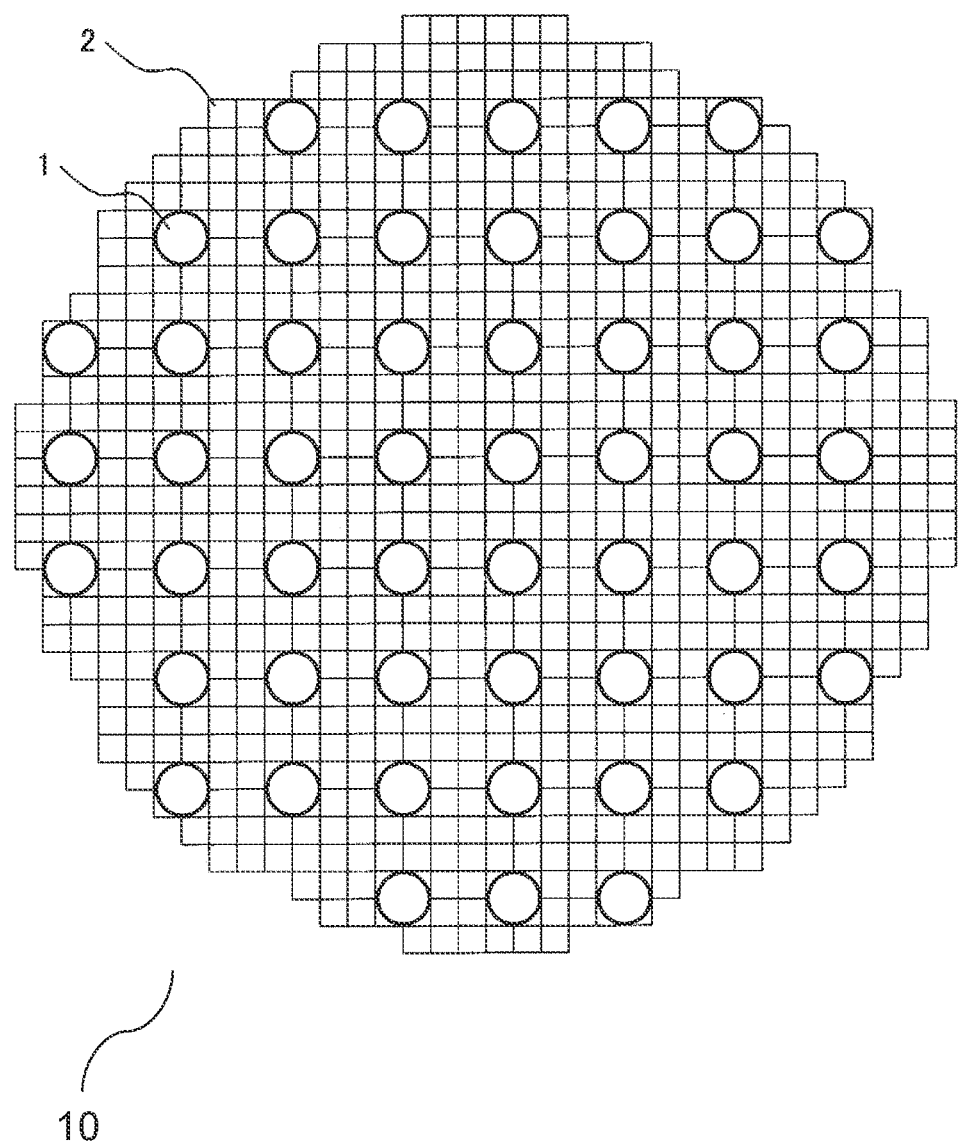

[FIG. 2]
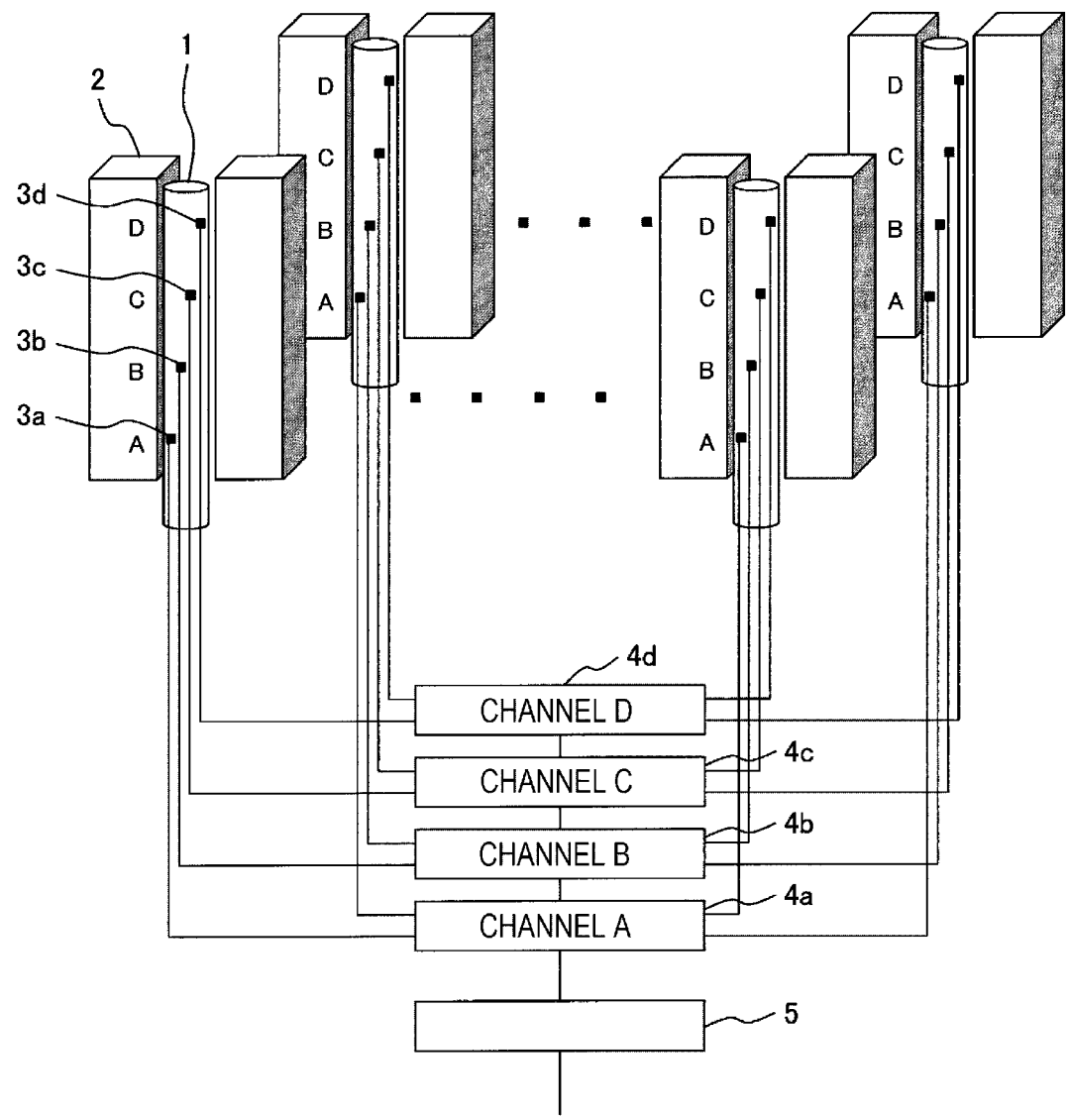

CONTROL ROD MOTION MONITORING SYSTEM AND CONTROL ROD MOTION MONITORING METHOD

TECHNICAL FIELD

The present invention relates to a control rod operation monitoring method and a control rod operation monitoring system, and in particular, a control rod motion monitoring method and a control rod motion monitoring system which can monitor an insertion motion of a control rod and is suitable for application to a boiling water reactor.

BACKGROUND ART

Generally, monitoring of a control rod operation, specifically, a drawing operation of a control rod in a boiling water reactor is performed. The monitoring of the drawing operation of the control rod is performed using a control rod drawing monitor to which an output signal from a local power range monitor (LPRM), which is a kind of a neutron detector arranged in a core, is input.

A plurality of fuel assemblies are loaded in the core that exists in a reactor pressure vessel of the boiling water reactor. The core has a plurality of cells including one control rod and four fuel assemblies arranged around the control rod. A plurality of LPRM assemblies including LPRMs are respectively arranged in parts of a range (a range where no control rod is inserted) surrounded by corner portions of the four adjacent fuel assemblies included respectively in four adjacent cells.

Specifically, when ½ symmetry with respect to a diagonal line of the core is considered and the core is folded at the diagonal line, the LPRM assemblies are loaded at all positions of a diagonal corner where the control rod is loaded. Each LPRM assembly includes a tube and four LPRMs respectively arranged in the tube at four positions (A, B, C and D) which are different in an axial direction of the core. Among the positions A, B, C, and D, the position A is the lowermost, and the positions B, C, and D are higher in this order in the axial direction of the core.

During operation of the boiling water reactor, the control rod to be drawn out from the core is selected to increase reactor power. The control rod is drawn out in a single mode for drawing out one control rod or in a gang mode for simultaneously drawing out a plurality of control rods.

As the background art in the technical field, there is a technique such as that in Patent Literature 1. Patent Literature 1 discloses "a control rod drawing monitor including a plurality of channels having the same function, in which all LPRM signals are input to each of the plurality of channels to acquire output signals of the LPRMs, an output signal of an average power range monitor (APRM), and a recirculation flow in the channels, so as to prevent drawing of the control rod".

In the control rod drawing monitor of Patent Literature 1, when the control rod drawn out from the core is selected, four LPRM assemblies that exist around the selected control rod and are close to the control rod are selected. Signals output from a total of eight LPRMs arranged at the position A and the position C in the four selected LPRM assemblies are input to one channel of the control rod drawing monitor and averaged. Further, signals (LPRM signals) output from a total of eight LPRMs arranged at the position B and the position D in the four LPRM assemblies are input to another channel of the control rod drawing monitor and averaged.

When either the average of the LPRM signals obtained in the former channel (A and C) or the average of the LPRM signals obtained in the latter channel (B and D) exceeds a set point, the control rod drawing monitor outputs a control rod drawing prevention signal for preventing the selected control rod from being drawn out to a control rod drive device that operates the selected control rod. The control rod drive device stops driving and the selected control rod is prevented from being drawn out.

The control rod drawing monitor has a function of preventing an abnormal increase in the output of the fuel assembly adjacent to the control rod to be drawn out in a drawing operation of the control rod for increasing the reactor power, and preventing a fuel rod included in the fuel assembly from being broken. From the viewpoint of preventing the fuel rod from being broken due to an increase in output, such a control rod drawing monitor monitors only the control rod drawing in which the reactor power increases.

Patent Literature 2 discloses an example of a control rod operation monitor having a function of preventing insertion of a control rod into a core. The control rod operation monitor also has a function of preventing the control rod from being drawn out from the core.

In a reactor, a cold critical test is conducted during shutdown of the reactor in which a plurality of control rods is drawn out to make the reactor locally critical for a short time. In the cold critical test, a reactivity input at the time of drawing out one notch of the control rod is limited, and a dispersing operation is performed before drawing out the one notch of the control rod when this limit is exceeded. In the dispersing operation, before drawing out the control rod having a high reactivity worth, another control rod is drawn out and a small reactivity worth is input to confirm an input reactivity worth. If there is no problem, the former control rod having a high reactivity worth is drawn out after the other control rod is inserted. In the dispersing operation, both drawing out the control rod and inserting the other control rod are performed.

The control rod operation monitor described in Patent Literature 2 prevents insertion of a selected control rod into the core when the control rod to be inserted in the dispersing operation is selected differently from a sequence. In addition, the control rod operation monitor prevents drawing out the selected control rod from the core when the control rod drawn out in the dispersing operation is selected differently from the sequence.

PRIOR ART LITERATURE

Patent Literature

PTL 1: JP-A-1-253695
PTL 2: JP-A-2012-163438

SUMMARY OF INVENTION

Technical Problem

Insertion of the control rod into the core during operation of the reactor reduces reactor power. However, even in the case of inserting the control rod into the core, when a plurality of control rods are inserted simultaneously, an output distribution in the axial direction of the core is distorted and the output at an upper portion of the core where no control rod is inserted increases, which may result in breaking of the fuel rod in that part. Therefore, it is necessary to monitor a control rod insertion in the entire core at all time.

In the control rod drawing monitor of Patent Literature 1, when a control rod to be drawn out is selected, as described above, the LPRM signals from the eight LPRMs that exist at the position A and the position C and are close to the selected control rod in one channel (A and C) are averaged, and the LPRM signals from the eight LPRMs that exist at the position B and the position D and are close to the selected control rod in the other one channel (B and D) are averaged.

Values of the respectively averaged LPRM signals in these two channels are normalized to a value of the output signal of the average power range monitor (APRM). For example, when the reactor power before drawing out the selected control rod is 100% of a rated power, the respectively averaged values obtained in the above two channels of the control rod drawing monitor are 100%. Then, when the average value obtained in any one of the channels becomes, for example, 105% by the drawing out the control rod, the selected control rod is prevented from being drawn out.

When either of the averages of LPRM signals obtained in the two channels exceeds the set point, the control rod drawing prevention in the control rod drawing monitor prevents the control rod from being drawn out. The following problem occurs when such a concept is applied to the control rod insertion prevention.

When a plurality of control rods are simultaneously inserted into the core, a gas phase portion of water as a coolant reduces, and the output at the upper portion of the core increases; however, the output at a lower portion of the core decreases. Therefore, when the LPRM signals at the position A and the position C as well as the LPRM signals at the position B and the position D are averaged, it is difficult to detect an increase in the output, and the control rod insertion prevention cannot be appropriately performed.

Further, the above control rod drawing monitor starts monitoring after the control rod to be drawn out is selected, and monitors the drawing out of the control rod by processing the LPRM signals. However, when the control rod moves regardless of operation of an operator due to a malfunction of equipment, an abnormal increase in the output of the core cannot be detected.

In addition, in a target control rod insertion event, the fuel rod breaks when a plurality of control rods are simultaneously inserted. Accordingly, it is necessary to lower a set point for event detection when monitoring the control rod insertion with LPRMs in a limited longitudinal direction range. However, a malfunction may occur frequently when the set point is lowered.

Therefore, an object of the invention is to provide a control rod motion monitoring method and a control rod motion monitoring system in which control rod insertion in the entire core is monitored at all time during operation of a reactor and, when an abnormality occurs, a signal is issued to a countermeasure device that automatically starts operation and an alarm is issued to prompt operation of an operator.

Solution to Problem

In order to solve the above problems, the invention has functions of dividing an LPRM detector in an LPRM assembly of an entire core into four channels for each height and averaging the indicated values, and of comparing the average indicated value with a set point at all time and issuing a signal to a countermeasure device when an abnormality occurs.

The invention provides a control rod motion monitoring system for a reactor, in which a plurality of neutron detector assemblies, which includes a plurality of neutron detectors arranged in an axial direction of a core, is arranged in a radial direction of the entire core. The control rod motion monitoring system includes: a signal processing device which averages neutron fluxes measured by neutron detectors located at substantially the same height in the axial direction of the core at all time; and an arithmetic device which transmits a signal to a plurality of devices based on the average value processed by the signal processing device.

The invention provides a control rod motion monitoring method for a reactor, in which a plurality of neutron detector assemblies, which includes a plurality of neutron detectors arranged in an axial direction of a core, is arranged in a radial direction of the entire core. The method includes: averaging neutron fluxes measured by neutron detectors located at substantially the same height in the axial direction of the core at all time; and transmitting a signal to a plurality of devices based on the average value.

Advantageous Effect

According to the invention, the control rod insertion in the entire core can be monitored at all time during operation of the reactor; when an abnormality occurs, an alarm can be issued to prompt a countermeasure device that automatically starts operation or operation of the operator, so that the influence on the fuel rod when the abnormality occurs can be reduced.

Problems, configurations, and effects other than those described above will be clarified by the description of the embodiments below.

BRIEF DESCRIPTION OF DRAWINGS

FIG. 1 illustrates a core layout of an LPRM assembly.

FIG. 2 illustrates a schematic system of a control rod motion monitoring system according to a preferred embodiment of the invention.

DESCRIPTION OF EMBODIMENTS

Embodiments of the invention will be described below with reference to the drawings. In the drawings, the same components are denoted by the same reference numerals, and detailed descriptions of repeated parts will be omitted.

First Embodiment

The invention divides an LPRM arranged in a core into four channels, and is conducted in a system including a signal processing device which averages indicated values of the channels and an arithmetic device having functions of comparing an average indicated value with a set point and of issuing a signal to a countermeasure device.

First, an arrangement of an LPRM assembly will be described with reference to FIG. 1. FIG. 1 is a plan view illustrating an arrangement of the LPRM assembly and a fuel assembly in a core 10. In the core 10, for example, 52 LPRM assemblies 1 including, for example, four LPRMs (not shown) are arranged at positions where there is no hindrance to operation of a control rod (not shown) between fuel assemblies 2.

When ½ symmetry with respect to a diagonal line of the core 10 is considered and the core 10 is folded at the diagonal line, the LPRM assemblies 1 are loaded at all positions of a diagonal corner where the control rod is loaded.

A control rod motion monitoring method and a control rod motion monitoring system of the present embodiment will be described with reference to FIG. 2. FIG. 2 illustrates a schematic system of the control rod motion monitoring system according to a preferred embodiment of the invention.

In the present embodiment, all the LPRM assemblies 1 in a furnace are used to detect an output fluctuation of the entire core 10. As illustrated in FIG. 2, an LPRM included in the LPRM assembly 1 is divided into, for example, four channels A to D for each core height, and indicated values of the LPRM (LPRMs 3a to 3d) of the channels are averaged by a signal processing device (4a to 4d).

FIG. 2 illustrates an example of a reactor in which a plurality of neutron detector assemblies (LPRM assemblies 1), which includes a plurality of neutron detectors arranged in an axial direction of the core 10, is arranged in a radial direction of the entire core 10. The neutron detectors (LPRMs 3a-3d) are arranged at substantially the same height in the axial direction of the core 10.

After the average indicated value is transmitted to an arithmetic device 5, a start signal is transmitted from the arithmetic device 5 to a countermeasure device and an alarm when it is determined that there is an abnormal result of signal processing. Such processing is performed at all time during operation of the reactor, so as to cope with a case where a control rod is inserted unexpectedly due to a malfunction or an erroneous operation of a device.

Next, a signal processing method performed in the arithmetic device 5 will be described. When a plurality of control rods start to be inserted into the core 10, the indicated value of the channel A (LPRM 3a) decreases while the indicated values of the other channels (LPRM 3b to 3d) increase. In the arithmetic device 5, a deviation of the indicated value of the channel A (LPRM 3a) and a deviation of the indicated values of the other channels (LPRMs 3b to 3d) are respectively calculated. When a maximum value of these deviations deviates from a preset set point, the start signal is transmitted to the countermeasure device, the control rod drive device, and the alarm (none of them shown).

As described above, it is possible to prevent a fuel rod from being broken in the event that the plurality of control rods is simultaneously inserted into the core 10.

Second Embodiment

In the first embodiment, by respectively calculating the deviation of the indicated value of the channel A (LPRM 3a) and the deviation of the indicated values of the other channels (LPRMs 3b to 3d) and comparing a maximum value thereof with a set point, an abnormal increase in the output of the core 10 is detected. However, a ratio of the indicated values of the channels B, C, D (LPRMs 3b to 3d) to the channel A (LPRM 3a) may be compared with a prescribed set point. In addition, when any indicated value of the channels exceeds a set point, a start signal may be transmitted to the countermeasure device or the alarm.

As described above, similarly to the first embodiment, it is possible to prevent a fuel rod from being broken in an event that a plurality of control rods is simultaneously inserted into a core.

In each of the above embodiments, a signal from an LPRM assembly at an outermost peripheral portion of the core may be ignored. In this case, the signal from the LPRM assembly at the outermost peripheral portion of the core, which is a likely low indicated value and causes a variation, is excluded from the averaging. Accordingly, the set point for an event detection can be increased to prevent malfunction.

In each of the above embodiments, the LPRMs (LPRMs 3a to 3d) that belong to the channels of A to D may be further divided into a plurality of sub-channels and signal processing may be performed, as long as an output fluctuation of the core can be detected. With sub-channeling, the system can be superimposed and the reliability of a control rod motion monitoring system can be improved.

The invention is not limited to the above embodiments, and includes various modifications. For example, the above embodiments are described in detail for easy understanding of the invention, and the invention is not necessarily limited to those including all the configurations described above. In addition, a part of the configuration of one embodiment can be replaced with the configuration of another embodiment, and the configuration of another embodiment can be added to the configuration of one embodiment. For a part of the configurations of each embodiment, other configurations can be added, removed, or replaced.

The invention claimed is:

1. A control rod motion monitoring system for a reactor comprising:
a plurality of neutron detector assemblies arranged in a radial direction of the core, each assembly including a plurality of neutron detectors, wherein the neutron detectors of each of the different neutron detector assemblies are located at a plurality of predetermined heights in the axial direction of the core, the plurality of predetermined heights being substantially the same for each of the different neutron detector assemblies and including a first predetermined height and a plurality of other predetermined heights;
a signal processing device which calculates average values of neutron fluxes continuously measured by the neutron detectors for each of the plurality of predetermined heights; and
an arithmetic device which outputs a signal based on the average values calculated by the signal processing device,
wherein
the arithmetic device calculates deviations of the calculated average values between the first predetermined height and the plurality of other predetermined heights and outputs the signal when a maximum value of the deviations exceeds a predetermined set point, and
the signal processing device monitors all of the neutron detector assemblies in the core and constantly monitors control rod insertion throughout the core to detect abnormalities.

2. The control rod motion monitoring system according to claim 1, wherein
the arithmetic device is configured to transmit the signal when the average values calculated by the signal processing device exceed another predetermined set point.

3. The control rod motion monitoring system according to claim 1, wherein
a signal from a neutron detector assembly, of the plurality of neutron detector assemblies, at an outermost peripheral portion of the core is excluded from the average values calculated by the signal processing device.

4. A control rod motion monitoring system for a reactor comprising:
- a plurality of neutron detector assemblies arranged in a radial direction of the core, each assembly including a plurality of neutron detectors, wherein the neutron detectors of each of the different neutron detector assemblies are located at a plurality of predetermined heights in the axial direction of the core, the plurality of predetermined heights being substantially the same height for each of the different neutron detector assemblies and including a first predetermined height and a plurality of other predetermined heights;
- a signal processing device which calculates average values of neutron fluxes continuously measured by the neutron detectors for each of the plurality of predetermined heights; and
- an arithmetic device which outputs a signal based on the average values calculated by the signal processing device, wherein
- the arithmetic device calculates a ratio between the calculated average value for the first predetermined height relative to the calculated average values for the plurality of other predetermined heights and outputs the signal when the ratio exceeds a predetermined set point, and
- the signal processing device monitors all of the neutron detector assemblies in the core and constantly monitors control rod insertion throughout the core to detect abnormalities.

5. The control rod motion monitoring system according to claim 4, wherein the arithmetic device is configured to transmit the signal when the average values calculated by the signal processing device exceed another predetermined set point.

6. The control rod motion monitoring system according to claim 4, wherein
- a signal from a neutron detector assembly, of the plurality of neutron detector assemblies, at an outermost peripheral portion of the core is excluded from the average values calculated by the signal processing device.

* * * * *